United States Patent [19]
Fletcher et al.

[11] 3,812,924
[45] May 28, 1974

[54] DEVICE FOR MONITORING A CHANGE IN MASS IN VARYING GRAVIMETRIC ENVIRONMENTS

[76] Inventors: James C. Fletcher, Administrator of the National Aeronautics and Space Administration with respect to an invention of; Joseph P. Valinsky, Huntington Beach, Calif.

[22] Filed: Mar. 13, 1973

[21] Appl. No.: 340,791

[52] U.S. Cl. .............. 177/200, 177/211, 177/246, 73/141 A
[51] Int. Cl. ...... G01g 19/00, G01g 3/14, G01g 1/18
[58] Field of Search .......... 177/200, 210, 211, 246, 177/DIG. 9; 73/141 A

[56] References Cited
UNITED STATES PATENTS
2,467,752  4/1949  Howe .......................... 177/211 UX
2,955,811  10/1960  Jonas et al. ..................... 177/211 X
3,029,883  4/1962  Kriznic ............................. 177/246
3,322,222  5/1967  Baun ................................. 177/210

*Primary Examiner*—George H. Miller, Jr.
*Attorney, Agent, or Firm*—L. D. Wofford, Jr.; W. H. Riggins; J. R. Manning

[57] ABSTRACT

A remotely operable device for detecting changes as they occur in the mass of a selected specimen. The device is characterized by a balance beam including at one end thereof a support for receiving a specimen having a changing mass and suspension means, including a flexure, supporting the beam near its center of gravity for pivotal movement imparted thereto proportionally to changes occurring in the mass of the specimen, and strain gages coupled with the flexure for providing a read-out indicative of the pivotal movement imparted to the beam.

3 Claims, 4 Drawing Figures

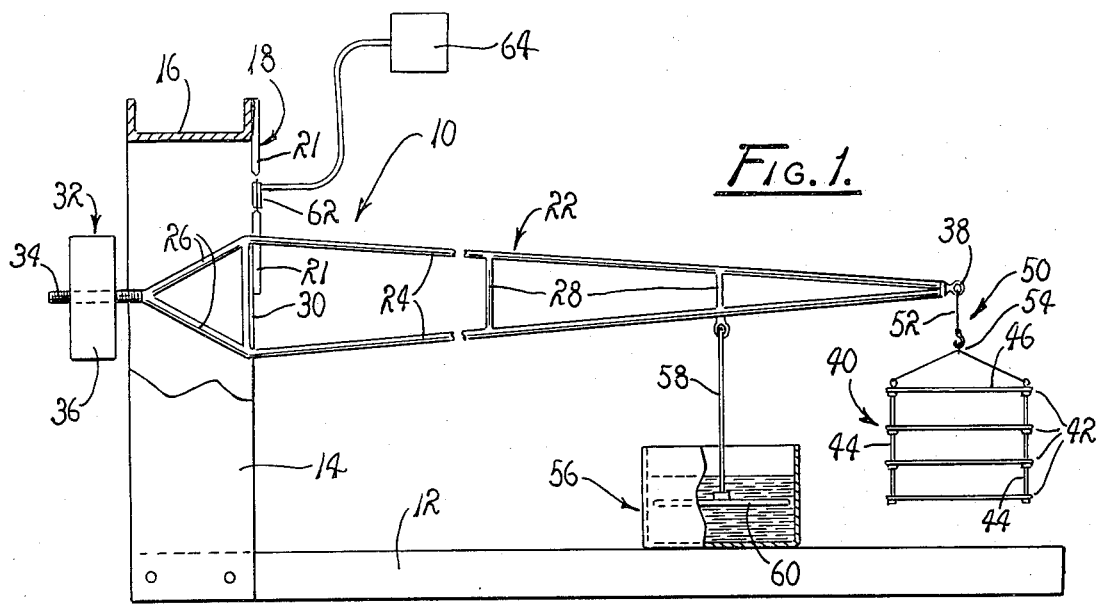
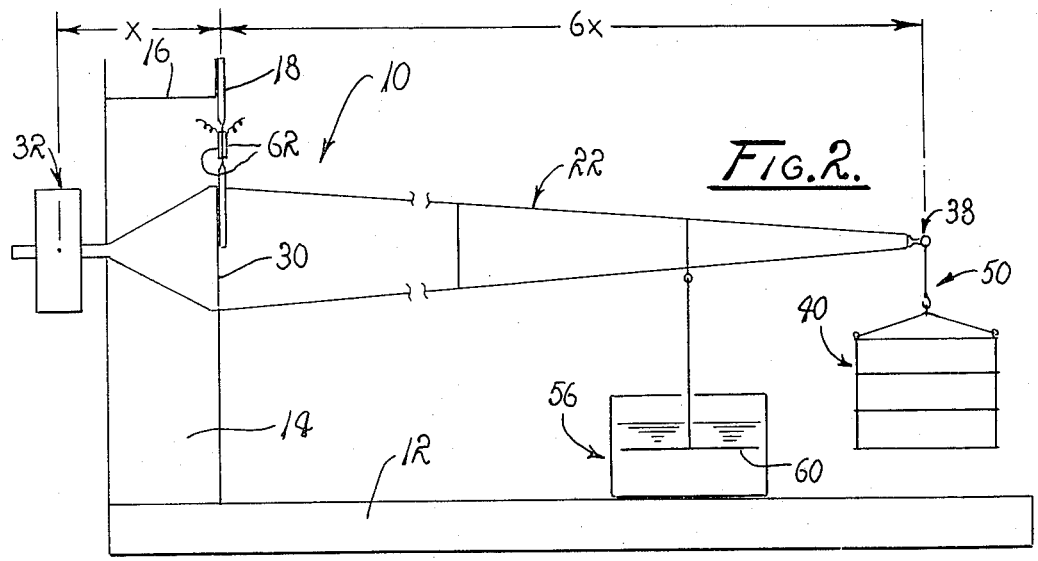
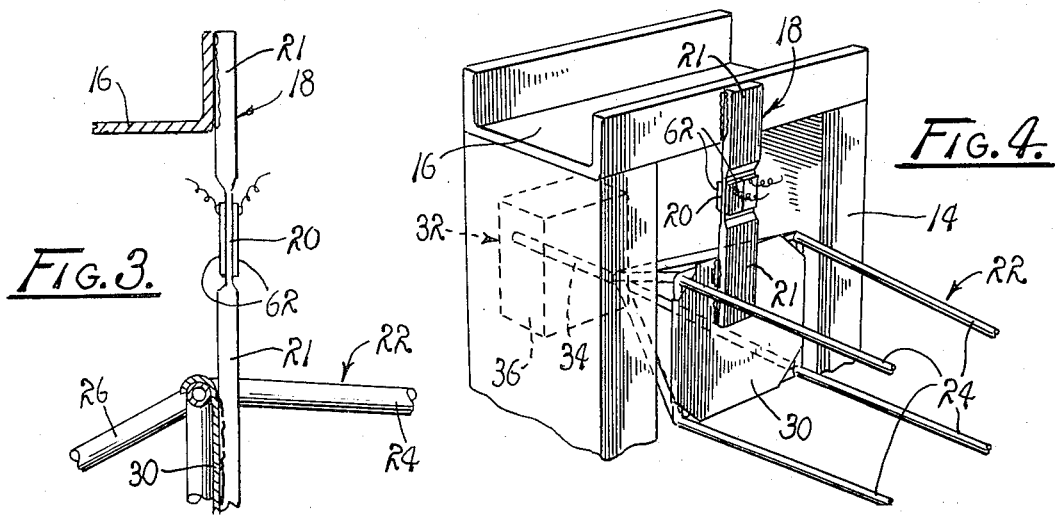

DEVICE FOR MONITORING A CHANGE IN MASS IN VARYING GRAVIMETRIC ENVIRONMENTS

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The invention relates to weighing devices and more particularly to a device for detecting changes as they occur in the mass of a selected specimen.

The prior art is, of course, replete with weighing devices including those which utilize flexures and strain gages for indicating weight. Such devices are typified by the patent to Cooke U.S. Pat. No. 3,667,560.

However, in the field of space exploration, it has become increasingly desirable and even necessary to detect changes as they occur in the mass of remotely oriented specimens. The need for remotely detecting changes in mass in given specimens is particularly acute in peforming material testing operations as well as in conducting probes. Furthermore, devices presently available generally are inadequate for remotely detecting relatively small changes, in the order of three milligram, as they occur in relatively large masses in the order of 500 grams, with high resolution.

The general purpose of the instant invention is, therefore, to provide a device particularly suited for remotely and continuously monitoring changes as they occur in the mass of selected specimens.

OBJECTS AND SUMMARY OF THE INVENTION

Accordingly, it is an object of the instant invention to provide a device for monitoring changes in the mass of selected specimens.

It is another object to provide a device for remotely monitoring changes occurring in the mass of selected specimens.

It is another object to provide a device having strain gages for detecting and measuring changes in mass as the change occurs in a selected specimen.

It is another object to provide for use in continuous monitoring operations a remotely operable, highly sensitive device for detecting relatively small changes in large masses of selected, nonuniform specimens.

It is still another object to provide a remotely operable, practical, efficient and accurate device for detecting changes as they occur in the mass of a selected specimen having a balance beam suspended near its center of gravity by a flexure having mounted thereon a strain gage for detecting motion imparted to the beam in response to changes in mass of a specimen thereby in spaced relation with the center of gravity.

These and other objects and advantages are achieved through a use of an elongated balance beam suspended from a flexure and including a specimen support provided at one end thereof in spaced relation with the flexure for receiving selected specimens, a counterbalancing mass affixed to the beam near the flexure, and strain gages mounted on the flexure for detecting stress induced in the flexure in response to changes in the mass of the specimen, as will become more readily apparent by reference to the following description and claims in light of the accompanying drawings.

BRIEF DESCRIPTION OF THE DRAWINGS

FIG. 1 is a partially sectioned side elevation of a device which embodies the principles of the instant invention.

FIG. 2 is a schematic view of the device shown in FIG. 1.

FIG. 3 is a fragmentary view, on somewhat of an enlarged scale, of the device shown in FIG. 1.

FIG. 4 is a fragmented, perspective view of the mounting of a flexure and associated strain gages, as provided for the device shown in FIG. 1.

DESCRIPTION OF THE PREFERRED EMBODIMENT

Referring now to the drawings wherein like reference characters designate like or corresponding parts throughout the several views, there is shown in FIG. 1 a device 10 which embodies the principles of the instant invention.

The device 10 preferably includes a base 12 upon which is mounted a pair of vertically oriented stanchions 14. Between the stanchions there is extended a transverse beam 16. From the beam 16 there is suspended a flexure 18 which is welded or otherwise securely affixed to the beam 16.

Preferably, the flexure 18 is fabricated from a suitable stainless steel material of a strip-like configuration having two thicknesses, as best illustrated in FIG. 3. As a practical matter, the flexure 18 includes a central portion 20 having a thickness of approximately one-third that of its opposite end portions, designated 21.

The lowermost end portion 21 of the flexure 18, as shown in FIG. 3, is welded or otherwise rigidly affixed to a balance beam 22 so that the beam is suspended for limited pivotal motion about an axis passing through the central portion 20 of the flexure 18. Hence, it can be appreciated that the flexure 18 is stressed in response to forces which act on the beam 22 in planes normal to the longitudinal axes thereof.

The beam 22 preferably is of an open-truss configuration and includes four rods 24, FIG. 4. These rods extend in a first direction, designated forwardly, from the center of gravity of the beam 22 while four rods 26 extend in an opposite direction, designated rearwardly, from the center of gravity of the beam. The rods 24, as well as the rods 26, are caused to converge and intersect at their distal ends. A plurality of interconnecting transverse support rods 28 also are employed in lending support to the rods 24 near their midpoints.

As best shown in FIG. 4, an anchor plate 30, normally related to the longitudinal axis of symmetry of the beam 22, is provided in a plane extended through the beam near its center of gravity. This plate serves as an anchor plate to which the lower portion 21 of the flexure 18 is affixed, by welding or the like.

In order to assure that the center of gravity of the beam 22 is located within the plane of the anchor plate, in order to establish a balanced condition for the beam, there is provided a counterbalancing weight 32 affixed to the distal ends of the rods 26. As a practical matter, the counterbalancing weight 32 includes a screw-threaded shaft 34 coaxially aligned with the longitudinal axis of symmetry of the beam 22 and rigidly affixed to the distal ends of the rods 26, by welding or the like. Upon the shaft 34 there is seated a mass 36, preferably provided as a metallic block having a concentric bore including internal screw threads for receiving therein the shaft 34. Therefore, it should be apparent that the mass 36 is positionable in axial directions relative to the anchor plate 30 by advancing the mass along the screw threads of the shaft 34.

To the distal ends of the converging rods 24, there is affixed a suitable bracket 38. The bracket 38 serves as a coupling through which a specimen holder 40 is connected with the beam 22. The specimen holder 40, as shown in FIG. 1, preferably includes multiple trays 42 united through a plurality of rods 44 suspended in spaced relation from a support plate 46. The support plate 46, in turn, is coupled with the bracket 38 through a coupling 50 including a flexible cable 52 affixed thereto at one end and having a hook-and-eye 54 provided at its lowermost end. Accordingly, it should be apparent that selected specimens placed on the trays 42 are supported by the beam 22.

It is, of course, to be understood that the greater the ratio of the distances between the test specimen, as it is supported by the specimen holder 40, and the flexure 18, and the counterbalancing weight 32 and the flexure 18, the greater is the realizable resolution of the device 10. A ratio of 6 to 1, depicted in FIG. 2, has proven quite adequate for measuring three milligram weight changes occuring in a 500 gram specimen.

It is important to understand, however, that the greater the ratio of the distances between a test specimen and the flexure 18, and the counterbalancing weight 32 and the flexure, the greater is the tendency to impart undesired oscillation to the beam. Therefore, a dash pot 56 is provided and coupled with the beam 22 through a suitable rod 58. The dash pot 56, preferably, is filled with oil of a suitable viscosity and includes a pressure plate 60 disposed therein and affixed to the coupling 58. Since the design and construction of dash pots are well known, a detailed description of the dash pot 56 is omitted in the interest of brevity.

Oscillatory motion imparted to the beam 22 is detected by a plurality of strain gages 62 affixed to the flexure 18 at the central portion 20 thereof. Preferably, the strain gages 62 are provided in pairs at opposite sides of the flexure and serve to measure bending stress in the flexure as a force is applied vertically to the beam 22. Since the design and construction of strain gages also are well known and the operation of such devices is fully understood, it suffices to understand that the strain gages 62 are coupled with a suitable source of electrical energy and provide an electrical read-out signal indicative of the stress induced in the flexure 18. As currently employed, the strain gages are of the type available under the designation PREMMCO EA-0-6-250BG$_1$-120, Option W. The strain gages 62 are, of course, coupled with a suitable read-out and recording device 64. As a practical matter, the device 64 also includes suitable telemetry circuitry for telemetering data acquired as changes occur in the mass of specimens supported by the holder 40.

OPERATION

It is believed that in view of the foregoing description, the operation of the device 10 will be readily understood and it will be briefly reviewed at this point.

With the device 10 assembled in the manner hereinbefore described, it is readied to be employed in an environment such as is found in celestial space and which may be substantially duplicated in test chambers and the like. It is, however, quite important to appreciate that the device is not limited to use in such environments.

Selected test specimens, the mass of which is to be observed, are deposited on the specimen holder 40 and the counterbalancing weight 32 is so positioned so that no bending stress is imparted to the flexure 18. It is important to understand, also, that the weight 32 is of a suitable mass, and is positioned along the shaft 34 at a selected distance from the flexure 18. Once balanced in an operative environment, a continuous re-balancing of the beam 22 is not required. Changes in the mass of specimens supported by the specimen holder 40 now serve to increase the bending stress imparted to the flexure 18. This stress is proportional to changes in the mass of the specimens supported by the holder 40 and results from changes in forces applied to the balance beam 22 as a consequence of changes in the mass of the specimens. The stress, in turn, is detected by the strain gages 62 and an electrical signal indicative of the stress now is applied to the read-out circuit 64. From here the signal is transmitted for utilization in a manner consistent with the intended utility of the device 10.

In view of the foregoing, it should readily be apparent that the device embodying the instant invention is remotely operable and is capable of being employed in hostile environments for detecting relatively small changes in relatively large masses of specimens.

Although the invention has been herein shown and described in what is conceived to be the most practical and preferred embodiment, it is recognized that departures may be made therefrom within the scope of the invention, which is not to be limited to the illustrative details disclosed.

We claim:

1. A device for monitoring changes as they occur in the mass of a selected specimen comprising:
    an elongated balance beam including means for supporting at one end thereof a specimen having a constantly changing mass, and means for supporting a fixed mass at the opposite end thereof;
    said balance beam defining an open truss structure comprising a plurality of rods and an anchor plate, said rods being spaced from each other at said anchor plate and converging in one direction toward said specimen supporting means and in the other direction toward said fixed mass supporting means;
    the distance between said anchor plate and said specimen supporting means being substantially greater than the distance between said anchor plate and said mass supporting means;
    suspension means including a flexure depending from an elevated support supporting the balance beam for pivotal motion imparted thereto in response to the changing mass of said specimen, said flexure being rigidly affixed at its opposite ends to said elevated support and to said anchor plate whereby the flexure is stressed proportionately with respect to pivotal motion imparted to said beam;
    said flexure comprising a central portion of reduced thickness between said anchor plate and said elevated support;
    means for measuring the stress of said flexure comprising a plurality of strain gages affixed to said central portion of said flexure;

said fixed mass supporting means comprising a screw-threaded shaft coaxially aligned with the longitudinal axis of symmetry of said beam and threadedly engaging said mass.

2. The invention as defined in claim 1 including a fluid-containing dash pot supported beneath said balance beam, a pressure plate disposed in said dash pot and coupled to said beam.

3. The invention as defined in claim 1 wherein said specimen supporting means is spaced substantially six times further from said anchor plate than is said mass.

* * * * *